June 23, 1953   A. L. WILLIAMS ET AL   2,643,318
WELD WHEEL CONSTRUCTION FOR SEAM WELDERS
Filed Feb. 7, 1950   3 Sheets-Sheet 1
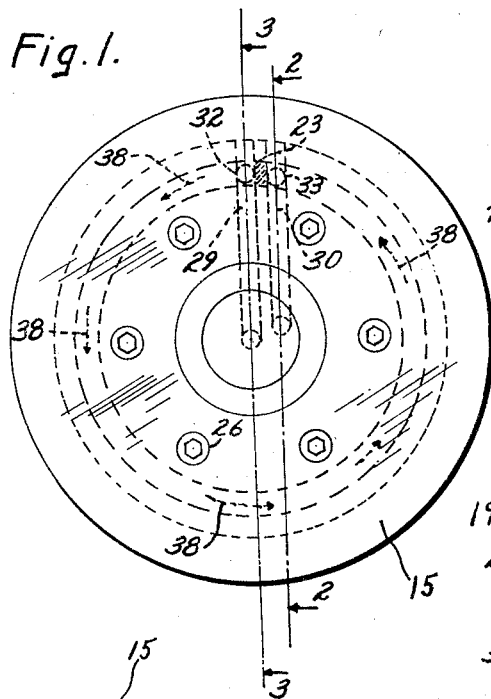
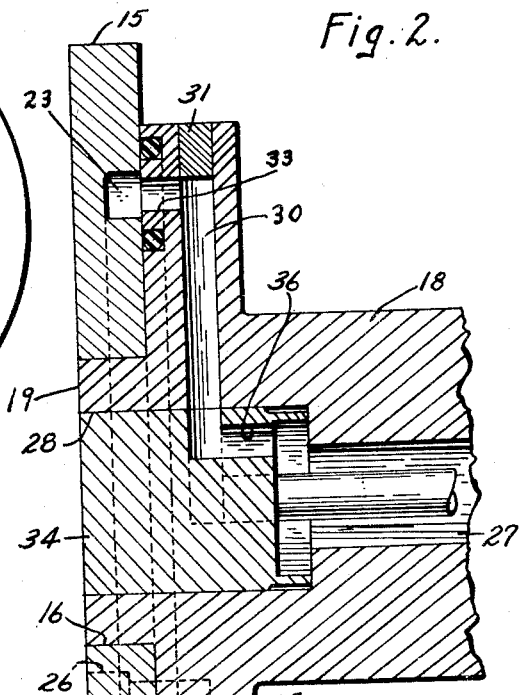
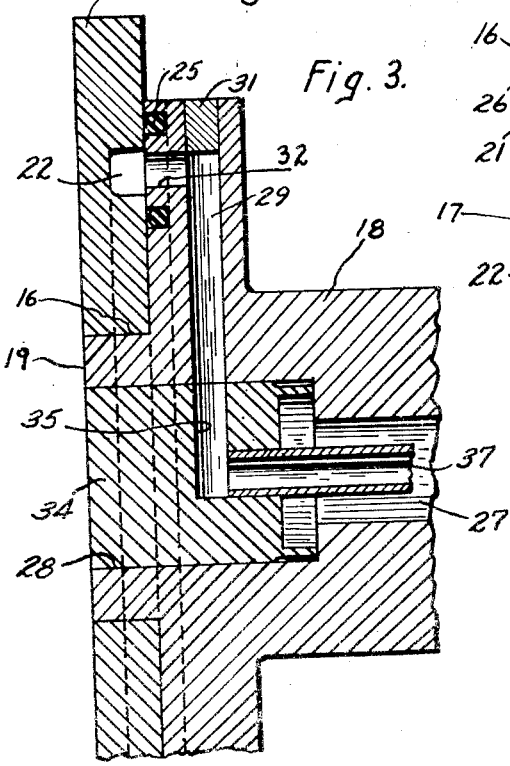
INVENTORS
Arthur L. Williams
and Emmet A. Craig
BY
ATTORNEY

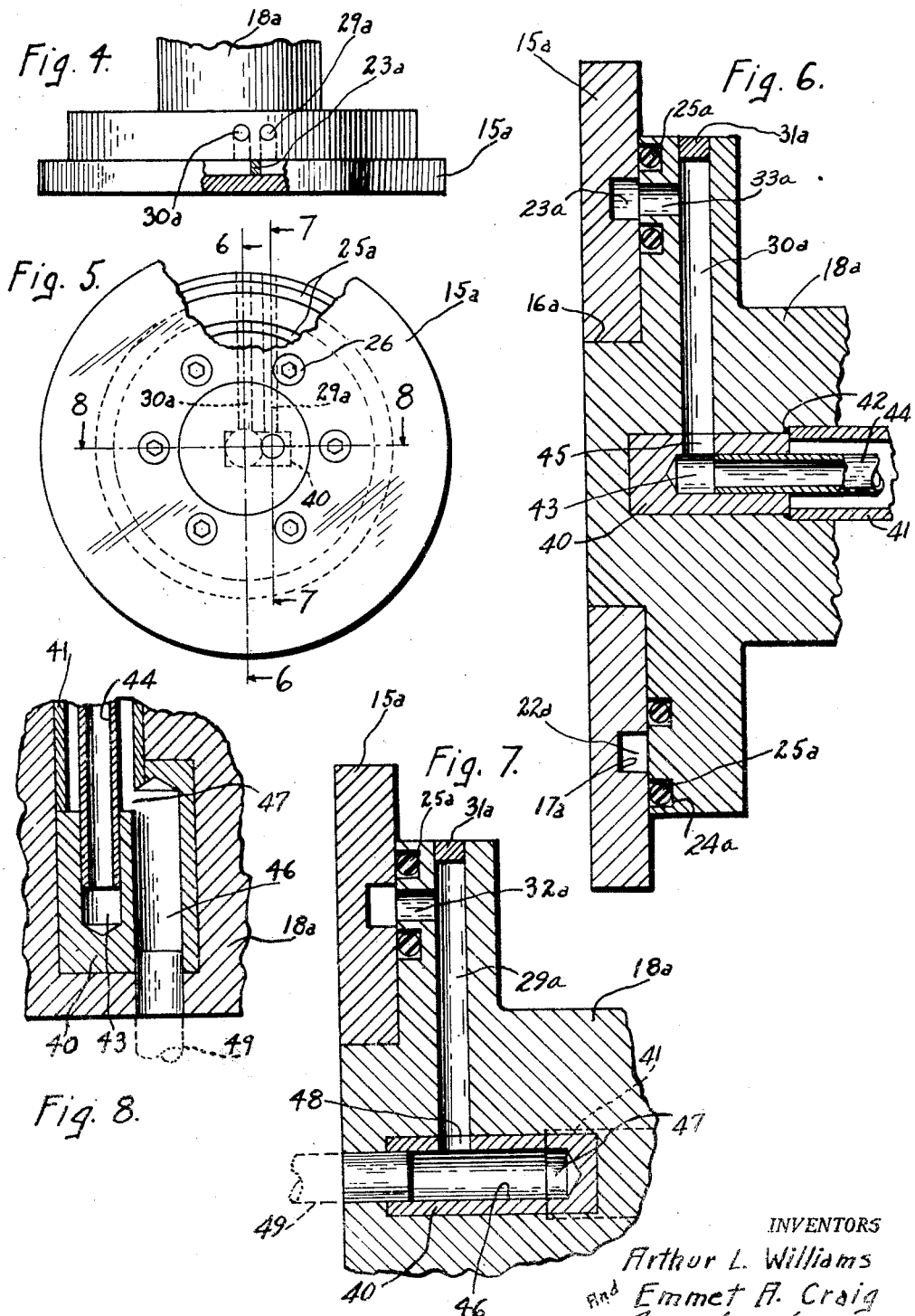

June 23, 1953  A. L. WILLIAMS ET AL  2,643,318
WELD WHEEL CONSTRUCTION FOR SEAM WELDERS
Filed Feb. 7, 1950  3 Sheets-Sheet 3
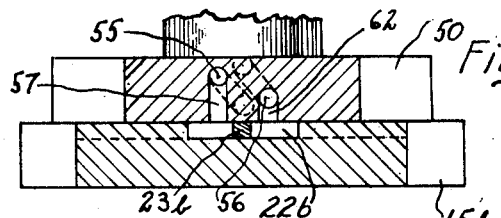
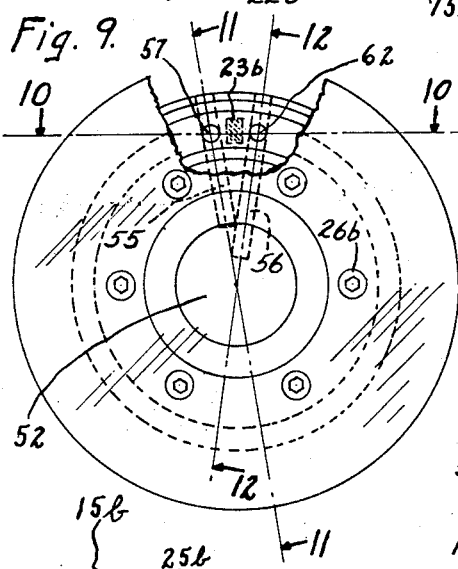
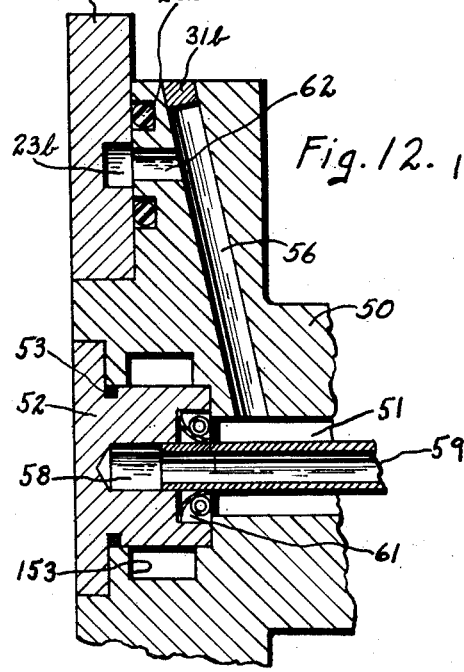
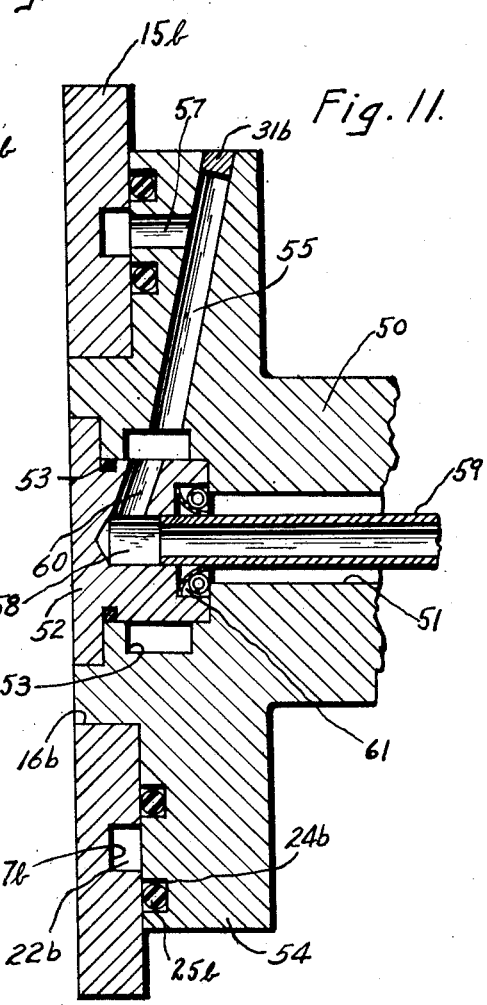
INVENTORS
Arthur L. Williams
AND Emmet A. Craig
BY
Attorney Patented June 23, 1953

2,643,318

UNITED STATES PATENT OFFICE 2,643,318

WELD WHEEL CONSTRUCTION FOR SEAM WELDERS

Arthur L. Williams and Emmet A. Craig, Warren, Ohio, assignors to Federal Machine & Welder Company, Warren, Ohio, a corporation of Ohio Application February 7, 1950, Serial No. 142,816

4 Claims. (Cl. 219—4)

Our invention relates to weld wheel constructions for seam welders and the principal object of our invention is to provide new and improved constructions of this character.

In electric resistance welding it is of importance to cool the electrodes to prevent overheating thereof in order to reduce maintenance and replacement costs and to insure consistently good weldments. Various means have heretofore been devised for cooling seam welding wheels but the results left much to be desired since such means were either expensive to manufacture or unreliable in operation, or both. Our invention provides an efficiently cooled weld wheel that is of low manufacture, maintenance and replacement cost.

In the drawings accompanying this specification and forming a part of this application, there are shown, for purposes of illustration, various embodiments which our invention may assume, and in these drawings:

Figure 1 is a front elevational view of a weld wheel illustrating one embodiment of our invention, Figure 2 is an enlarged fragmentary vertical sectional view corresponding generally to the line 2—2 of Figure 1, Figure 3 is an enlarged fragmentary vertical sectional view corresponding generally to the line 3—3 of Figure 1, Figure 4 is a front elevational view of a weld wheel illustrating another embodiment of our invention, parts being broken away to better illustrate construction, Figure 5 is a top plan view of the embodiment shown in Figure 4, with parts broken away, Figure 6 is an enlarged fragmentary vertical sectional view corresponding generally to the line 6—6 of Figure 5, Figure 7 is an enlarged fragmentary vertical sectional view corresponding generally to the line 7—7 of Figure 5, Figure 8 is an enlarged fragmentary transverse sectional view corresponding generally to the line 8—8 of Figure 5, Figure 9 is a front elevational view of a weld wheel showing still another embodiment of our invention, with parts broken away, Figure 10 is a transverse sectional view corresponding generally to the line 10—10 of Figure 9, Figure 11 is an enlarged fragmentary vertical sectional view corresponding generally to the line 11—11 of Figure 9, and Figure 12 is an enlarged fragmentary vertical sectional view corresponding generally to the line 12—12 of Figure 9.

Referring to Figures 1 through 3, the embodiment of the invention therein disclosed comprises a weld wheel 15 formed with means for receiving a coolant such, for example, as water. As herein disclosed, the wheel 15 is generally disc-like and is formed with a central opening 16. One side surface of the wheel is formed with an annular groove 17.

A spindle 18 is provided for supporting and rotating the weld wheel 15. As here shown, the spindle is provided with a centering portion 19 which closely fits within the opening 16 of the wheel. A flange 20 is formed inwardly of the centering portion 19 and provides a surface 21 which abuts the grooved side surface of the wheel 15 and closes the open side of the groove 17 to form an annular chamber 22 for receiving the coolant. Block means are interposed in the chamber 22 to interrupt complete annular flow through the chamber. Such block means may be of any suitable construction and as herein disclosed comprises a web 23 of a contour following the cross-sectional contour of the groove 17 and brazed or otherwise secured to the walls of the groove. The surface 21 of the flange 20 engages the adjacent surface of the web 23 to complete the coolant block. It will be appreciated that the block may be carried by the flange 20, or may be in the form of a threaded plug or any other suitable structure.

The surface 21 of the flange 20 is formed with a pair of annular spacer-apart grooves 24 of such diameters as to be positioned on opposite sides of the groove 17. Each of the grooves 24 makes provision for sealing means to seal against leakage of coolant from the chamber 22. At the present time it is preferred to dispose an O-type sealing ring 25 in each of the grooves 24, the rings being of sufficient cross-sectional size to provide efficient sealing when the wheel 15 and flange 20 are secured together. In the present case, bolts 26 pass through apertures in the wheel and are threaded into the spindle 18 for the purpose of properly holding the wheel to the flange.

Referring particularly to Figures 2 and 3, the spindle 18 is hollow to provide a longitudinal opening 27. This opening, at the forward end of the spindle, is enlarged as shown at 28. The spindle is formed with passageways communicating with the chamber 22 to provide for inlet and outlet of coolant and, in the construction shown in Figures 1 through 3, the flange 20 is provided with a pair of generally radially extending openings 29 and 30 which may be formed by a drilling operation, the outer ends of such openings being closed by plugs 31.

Short transverse openings 32 and 33 respectively connect the openings 29 and 30 with the chamber 22, and as best seen in Figure 1 the openings 32 and 33 enter the chamber 22 at opposite sides of the block 23.

A body or plug 34 is positioned within the enlargement 28 of the opening 27 and is held in position in any suitable manner, such as by means of a press fit. The body 34 has a pair of openings 35 and 36 which respectively connect the openings 29 and 30 with a conduit 37 and with the longitudinal opening 27 formed in the spindle 18. The conduit 37 extends through the opening 27 but is in spaced relation with respect to the walls thereof.

From the foregoing, it will be appreciated that fluid may flow through the conduit 37, through the openings 35, 29 and 32 to the chamber 22, and such fluid flows through the chamber 22 in the direction of the dotted arrows 38 shown in Figure 1 until it reaches the blocking means 23. The fluid then flows from chamber 22 through openings 33, 30, 36 and through the elongated opening 27 in the spindle 18 to exhaust. It will be appreciated that fluid flow may be reversed, if desired. Any conventional means of delivering coolant fluid to the conduit 37 and exhausting fluid from the opening 27 may be provided. Such means form no part of our invention and are therefore not disclosed.

The embodiment of the invention shown in Figures 4 through 8 is somewhat similar to the embodiment hereinbefore described, and similar parts are given like reference numerals supplemented by the suffix $a$.

In this particular embodiment, a body 40 is cast in position during the casting of the spindle 18$a$. Prior to casting operation a tube 41 is welded to the body, as shown at 42, and the body 40 is drilled, as at 43, to receive a tube 44 that extends through the tube 41 in spaced relation. A transverse opening 45 in the body 40 establishes communication between the drilled hole 43 and the opening 30$a$.

Another hole 46 (see Figures 7 and 8) is drilled in the body along-side the hole 43 and the inner end of the hole 46 breaks through the wall of the body, as shown at 47, so as to communicate with the interior of the tube 41. A transverse opening 48 in the body 40 establishes communication between the drilled hole 46 and the opening 29$a$.

A rod 49 extends into the opening into the hole 46 and is used, together with the tube 41, to position the body in the mold in which the spindle 18$a$ is cast. Following casting operation, the rod 49 may be sawed-off flush with the adjacent face of the spindle and used as a plug to close the opening into the hole 46.

In the embodiment shown in Figures 5 through 8, a cooling fluid may flow through the conduit 44, hole 43, openings 45, 30$a$, 33$a$ to chamber 22$a$, and through chamber 22$a$, as before, until the fluid strikes the block 23$a$, whereupon fluid then flows outwardly of chamber 22$a$ through openings 32$a$, 29$a$, 48, hole 46, body interruption 47 and is exhausted through tube 41.

In the embodiment shown in Figures 9 through 12, the weld wheel is similar to the wheels hereinbefore described and similar parts bear like reference numerals supplemented by the suffix $b$.

The spindle 50 in this embodiment is somewhat similar to the spindles hereinbefore referred to, and as before is formed with a central opening 51 which, at its forward end, has an enlargement for receiving the closure body 52. Suitable sealing means, such as the O-ring seal 53, may be used to prevent leakage. An undercut portion in the enlargement provides an annular recess 153.

The flange 54 of the spindle 50, as before, co-operates with the weld wheel to close the open side of the groove 17$b$ to form the chamber 22$b$, and the block 23$b$ is secured within the chamber in a manner already described. A pair of generally radially extending passageways 55 and 56 are drilled in the flange 54 at angles divergent with respect to each other, as illustrated in the drawings.

The passageway 55 communicates with the chamber 22$b$, at one side of the block 23$b$, by means of a transverse opening 57, the outer end of the passageway 55 being plugged, as before. The inner end of the passageway 55 communicates with the annular recess 153, as seen in Figure 11. The body 52 is provided with a central drill hole 58 which receives a tube 59, and the latter extends in spaced relation through the opening 51. A transverse opening 60 in the body 52 establishes communication between the annular recess 153 and the drilled hole 58, and a seal 61 prevents leakage at the connection of the tube 59 with the body 52.

The passageway 56 communicates with the chamber 22$b$, at an opposite side of the block 23$b$ (with respect to the passageway 55) through means of a transverse opening 62. The outer end of the passageway 56 is plugged, and the inner end of this passageway communicates with the opening 51 which extends through the spindle 50.

In operation, coolant fluid may enter the tube 59 and pass through drill hole 58, opening 60, annular recess 153, passageway 55, opening 57 and enter chamber 22$b$. This fluid circulates through chamber 22$b$ until it strikes block 23$b$, whereupon it leaves chamber 22$b$ by means of opening 62, passageway 56 and is exhausted through opening 51.

In view of the foregoing, it will be apparent to those skilled in the art that we have accomplished at least the principal object of our invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that our invention is not limited thereto.

We claim:

1. A weld wheel construction for a seam welder, comprising: a disc-like weld wheel having an annular groove formed in a side surface; flange means having a surface abutting said side surface and closing the open side of said grooves to form an annular chamber for receiving coolant means; said flange means having spaced annular grooves disposed on opposite sides of said chamber; and sealing means within respective ones of said spaced grooves for sealing against leakage from said chamber.

2. A weld wheel construction for a seam welder, comprising: a disc-like weld wheel having a central opening and also having an annular groove circumscribing said opening and formed in a side surface; spindle means for rotating said weld wheel, having a centering portion fitting the opening in said weld wheel and also having flange provided with a surface abutting said side surface and closing the open side of said groove to form a chamber for receiving coolant means, said flange surface having spaced annular grooves formed therein and disposed on opposite sides of said chamber; O-ring packing in each of said flange grooves for sealing against leakage from said chamber; block means within said chamber to interrupt coolant circulation therethrough at at least one point in said chamber; said spindle means having a pair of passageways formed therein and communicating with said chamber at opposite sides of said block means, said passageways providing for inlet and outlet of coolant means to and from said chamber.

3. A weld wheel construction for a seam welder, comprising: a disc-like weld wheel having a central opening and also having an annular groove circumscribing said opening and formed in a side surface; spindle means for rotating said weld wheel, having a centering portion fitting the opening in said weld wheel and also having a flange provided with a surface abutting said side surface and closing the open side of said groove to form a chamber for receiving coolant means, and said spindle means having a longitudinal opening for passage of coolant means and a conduit within said longitudinal opening for passage of coolant means, said flange having a pair of generally radially extending passageways, each having connection with said chamber; body means within said longitudinal opening for establishing coolant communication between one passageway and said longitudinal opening and also establishing coolant communication between the other passageway and said conduit; and block means within said chamber and disposed intermediate the connection of said passageways with said chamber.

4. A weld wheel construction for a seam welder, comprising: a disc-like weld wheel having a central opening and also having an annular groove circumscribing said opening and formed in a side surface; spindle means for rotating said weld wheel, having a centering portion fitting the opening in said weld wheel and also having a flange provided with a surface abutting said side surface and closing the open side of said groove to form a chamber for receiving coolant means, said flange having spaced annular grooves formed therein and disposed on opposite sides of said chamber; O-ring packing in each of said flange grooves for sealing against leakage from said chamber; said spindle means having a longitudinal opening for passage of coolant means and a conduit within said longitudinal opening for passage of coolant means, said flange having a pair of generally radially extending passageways, each having connection with said chamber; body means within said longitudinal opening for establishing coolant communication between one passageway and said longitudinal opening and also establishing coolant communication between the other passageway and said conduit; and block means within said chamber and disposed intermediate the connection of said passageways with said chamber.

ARTHUR L. WILLIAMS.
EMMET A. CRAIG.

References Cited in the file of this patent

UNITED STATES PATENTS

| Number | Name | Date |
|---|---|---|
| 1,580,401 | Borgadt | Apr. 13, 1926 |
| 1,778,628 | Eckman | Oct. 14, 1930 |
| 2,136,059 | Sciaky | Nov. 8, 1938 |
| 2,254,657 | Kennon | Sept. 2, 1941 |
| 2,280,111 | Widell | Apr. 21, 1942 |
| 2,407,676 | Munson | Sept. 17, 1946 |